United States Patent [19]

Töpfer et al.

[11] Patent Number: 5,070,224
[45] Date of Patent: Dec. 3, 1991

[54] WIRE EROSION MACHINE

[75] Inventors: Klaus Töpfer, Worfelden; Konrad J. Popp, Bobingen, both of Fed. Rep. of Germany

[73] Assignee: Nassovia Werkzeugmaschinen GmbH, Langen, Fed. Rep. of Germany

[21] Appl. No.: 448,017

[22] Filed: Dec. 8, 1989

[30] Foreign Application Priority Data

Dec. 8, 1988 [DE] Fed. Rep. of Germany ....... 3841314

[51] Int. Cl.⁵ .......................... B23H 1/00; B23H 7/10
[52] U.S. Cl. ................................. 219/69.12
[58] Field of Search ............... 219/69.11, 69.17, 69.12, 219/68, 69.1; 204/206, 224 M

[56] References Cited

U.S. PATENT DOCUMENTS

| 3,731,044 | 5/1973 | Ullmann et al. | 219/69.12 |
| 3,731,045 | 5/1973 | Ullmann et al. | 219/69.12 |
| 4,430,718 | 2/1984 | Hendren | 219/69.12 |

FOREIGN PATENT DOCUMENTS 306829  12/1988  Japan ................. 219/69.17

Primary Examiner—Geoffrey S. Evans
Attorney, Agent, or Firm—Toren, McGeady & Associates

[57] ABSTRACT

Wire erosion machine in portal construction comprising a machine bed with two lateral columns and a portal bridge, a workpiece clamping table frame, an upper cantilever arm above the latter comprising a wire deflecting guide, a lower cantilever arm below the latter comprising a wire deflecting guide, guide carriage and slide provided with controllable forward feed drives for the relative displacement of the cantilever arms in the x, y and z axes relative to the workpiece clamping table frame, as well as a portal column comprising one or more pieces and forming a first structural component unit, a portable bridge comprising one or more pieces which forms a second autonomous structural unit, is exchangeable, can be placed on the portal column and is rigidly connectable with the latter, exchangeable guide carriages above and below the portal bridge in each instance which are displaceable in the x axis in guides and form a third and a fourth autonomous structural component group, guide slides which are arranged at the guide carriages of the third and fourth structural component groups, constructed so as to be displaceable in the y axes as autonomous exchangeable units, and upper and lower cantilever arms which are connected with the latter and provided with wire guide and deflecting members.

10 Claims, 6 Drawing Sheets

WIRE EROSION MACHINE

DESCRIPTION

The invention is directed to a wire erosion machine in portal construction as is shown e.g. in Manfred Feuerer, "Electro-erosive Metal Working", Würzburg 1983, page 31, plate 2.10 b, and as mentioned on page 30, at bottom. In addition, the high demands for rigidity, resistance to vibration and thermal stability which must be made on the designing of the machine are explained in detail on pages 29 and 30.

The portal constructions have proven most successful in this respect because a greater rigidity, damping capacity and, accordingly, resistance to vibration can be achieved with the latter than in machine columns with open C-frame.

According to the prior art, the machine frame in portal construction generally comprises lateral columns which are arranged on both sides of the machine bed at a distance from one another and are connected by means of the portal bridge to form a closed frame. Since wire erosion machines are needed and produced in different sizes and dimensions, this requires the constant development of portal machine frames which are designed for different sizes.

Because of the increasingly varying machining tasks of such machines, only smaller carriage movements may be required e.g. for smaller workpieces with greater thickness in the x and y axes, but greater lifts in the z axis and higher outputs may also be needed because of the great differences in thickness. Conversely, workpieces also occur which have a greater length and in which a greater number of small openings must be machined so as to be distributed along the surface. Therefore, machines are needed which have smaller carriage movements in the x axis and greater carriage movements in the y axis and different ranges of carriage movement in the z axis.

Due to the standard classes of these machines determined in erosion machine construction, the carriage movement ranges and accordingly also the output ranges cannot be taken into consideration sufficiently corresponding to these sharply diverging demands on the machining requirements.

Based on these considerations, the object of the invention is to construct autonomous and exchangeable structural component units of various design by means of an organized structural component system so as to be compatible in such a way that they can be combined to form machine conceptions of changeable dimensions which can be individually adapted to the machining tasks without the rigidity and resistance to vibration of the machine frame being impaired.

Proceeding from a wire erosion machine in portal construction with a machine bed, two lateral columns and a portal bridge, a workpiece clamping table frame, an upper cantilever arm above the latter comprising a wire deflecting guide, a lower cantilever arm below the latter comprising a wire deflecting guide, guide carriage and slide provided with controllable drives for the relative displacement of the cantilever arms in the x, y and z axes relative to the workpiece clamping table frame.

Significant manufacturing advantages result from the organization of the overall machine frame into two frame components, i.e. portal column and portal bridge; further, it is possible e.g. to place a lighter or heavier portal bridge on a given portal column. In addition, the upper and the lower carriage guide slide can be identically constructed in the x axis. Moreover, it is possible to use heavier or lighter guide carriages for the x axis.

Other advantages also result for the guide carriages in the y axes. Lighter and heavier constructions can also be used in machine construction which is otherwise identically constructed or they can be exchanged subsequently.

The portal column, as first structural component unit, can consist of a machine bed and portal cheeks which are connected with the latter so as to form one piece at both sides; it may also be advisable to produce the portal columns in a multiplepiece manner from parts which are rigidly connected with one another, e.g. from a middle machine bed and lateral beds with portal cheeks at both sides. This manner of production is preferably applicable in particularly large machines. In addition, this manner of construction makes it possible to provide the two lateral beds with portal cheeks which swivel out laterally, so that the guide carriage stroke in the x axis can be lengthened.

The portal cheeks and the portal bridge can be exchanged, e.g. in order to rework the guides, due to the detachability of the rigid connections between them. But it is also possible to exchange a portal bridge for a larger or longer or smaller or shorter one if it seems advisable for carrying out large-scale machining in thick workpieces.

Finally, additional advantages are also connected with the construction of the machine frame, according to the invention, in manufacturing, since different constructions can be applied in larger construction series and can be combined when necessary to form machine constructions which are extensively adapted to the machining requirements.

The great advantages of the modular construction of the overall machine frame including the guide carriage and the cantilever arms are not limited to the exchangeability of the individual components or elements, but rather contrast with additional prior art, DE-PS 20 52 123. In the latter, according to FIG. 1, a first cross carriage in portal construction is displaceable in the y axis and a second cross carriage arranged at the latter is displaceable in the x axis. The latter is also provided with four additional carriage guides, one for the u and v axes, one for the z axis, and a vertical guide for the lower wire guide head. This machine configuration accordingly requires six carriage guides, the u-guides and the v-guides serving to produce guide cams with conical sectional areas. The movement possibility of the u-carriage is limited, since it is hindered by the support arranged at the x-carriage with carriage guide for the lower wire guide head.

There is an even greater degree of hindrance according to the configuration according to FIG. 2. In the latter, there are two complete cross carriages for the x and y axes; in addition to this, there is the z-guide and the guide for the lower wire guide head. In this instance, the two x carriages hamper one another with respect to their movement possibility. This hampering is dispensed with in the subject matter of the invention, and there is the additional advantage that the cross carriage can be identically constructed with respect to the x and u axes and the y and v axes in most structural components.

Other characteristics and particulars of the invention are described and explained in more detail with the aid of the embodiment example shown in the drawing.

Figure 1:
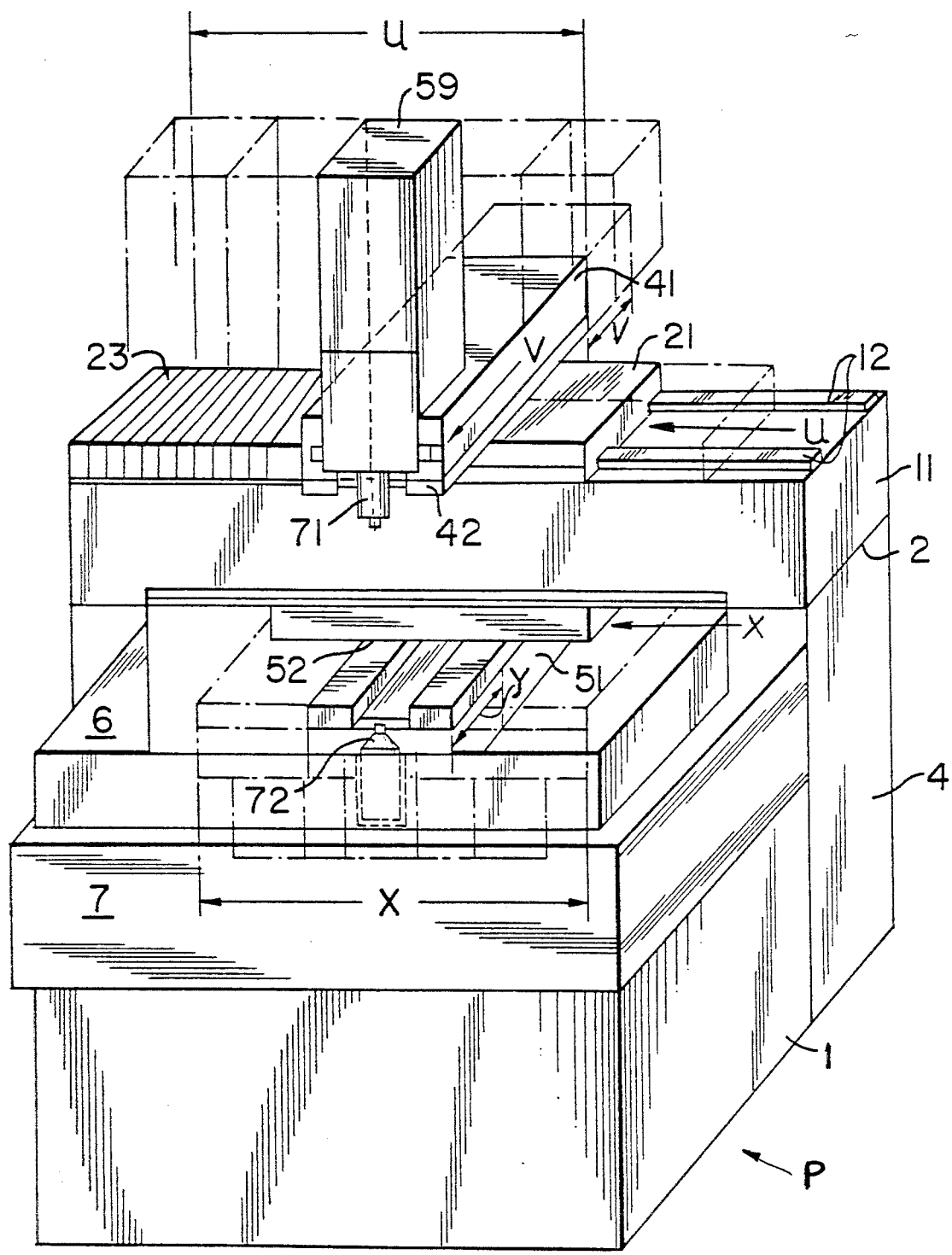
FIG. 1 shows a perspective view of the wire erosion machine according to the invention.

In FIG. 1, the portal column comprising the machine bed 1 and the portal cheeks 2 at both sides is designated by P. The portal bridge 11 is rigidly but detachably connected with the portal cheeks 2.

Figure 2:
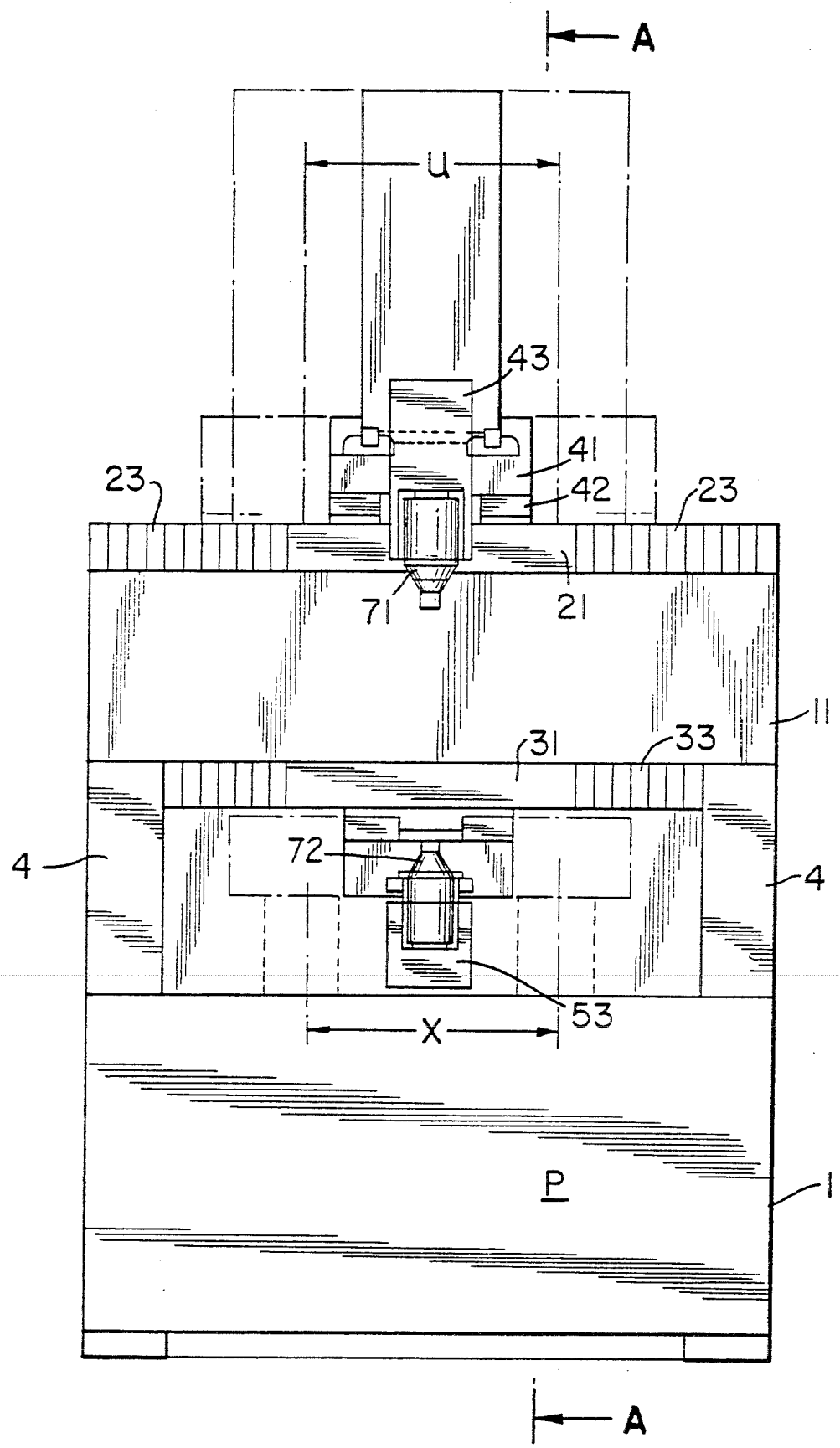
FIG. 2 shows the front view of the machine.
Figure 3:
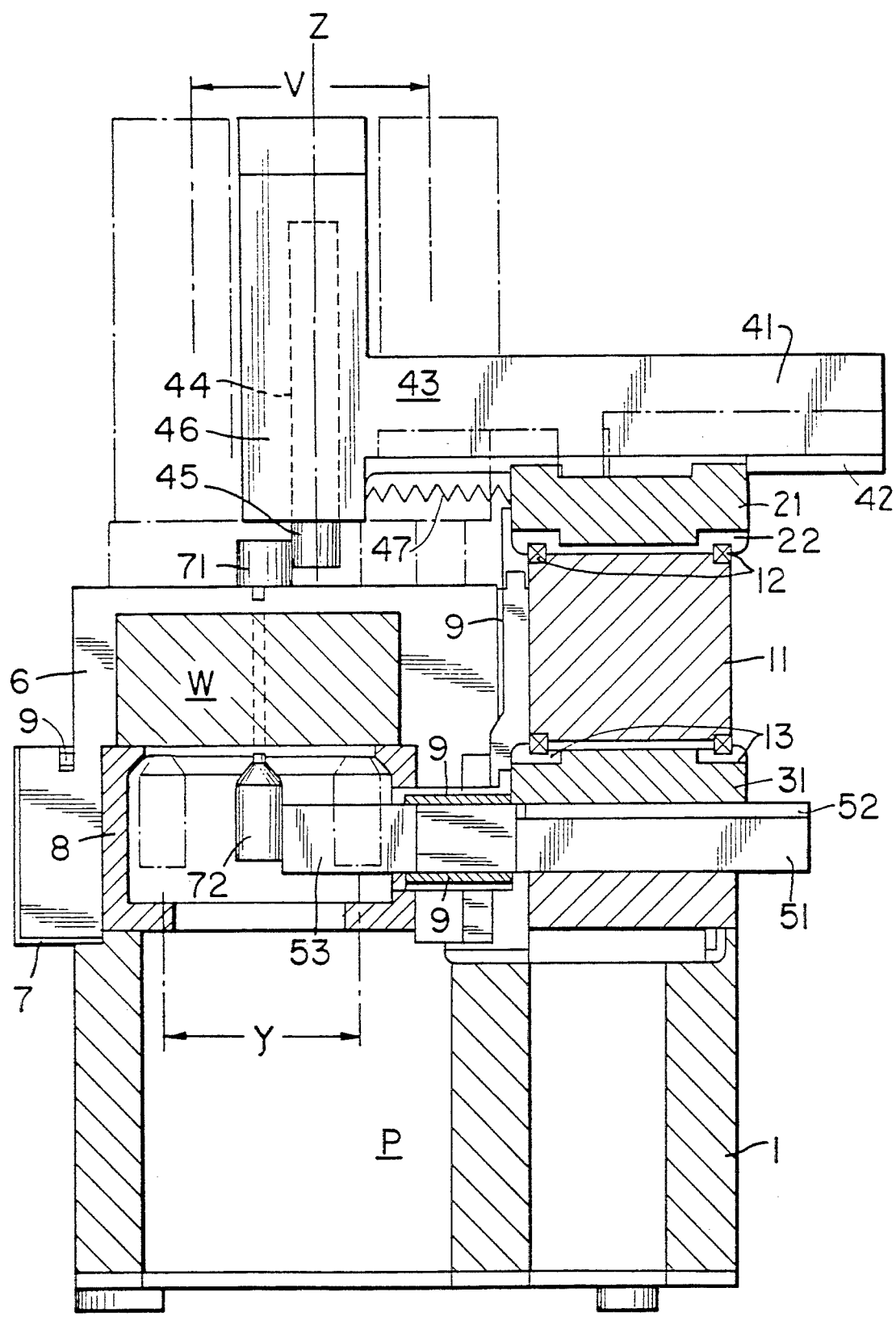
FIG. 3 shows a section A—A of the machine according to FIG. 2.
Figure 10:
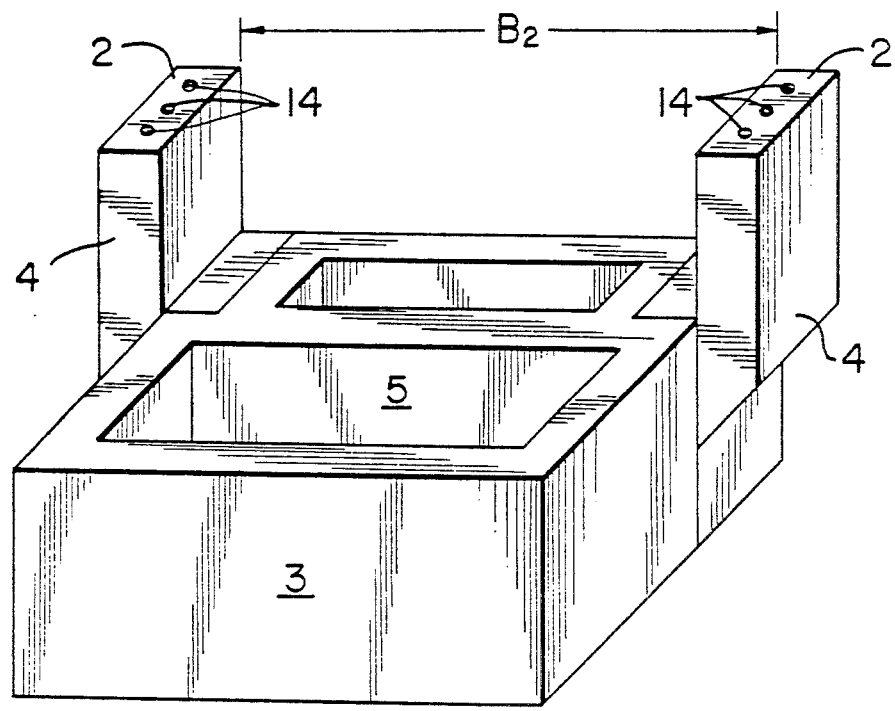
FIG. 10 shows the three-part machine bed in modified construction.
Figure 11:
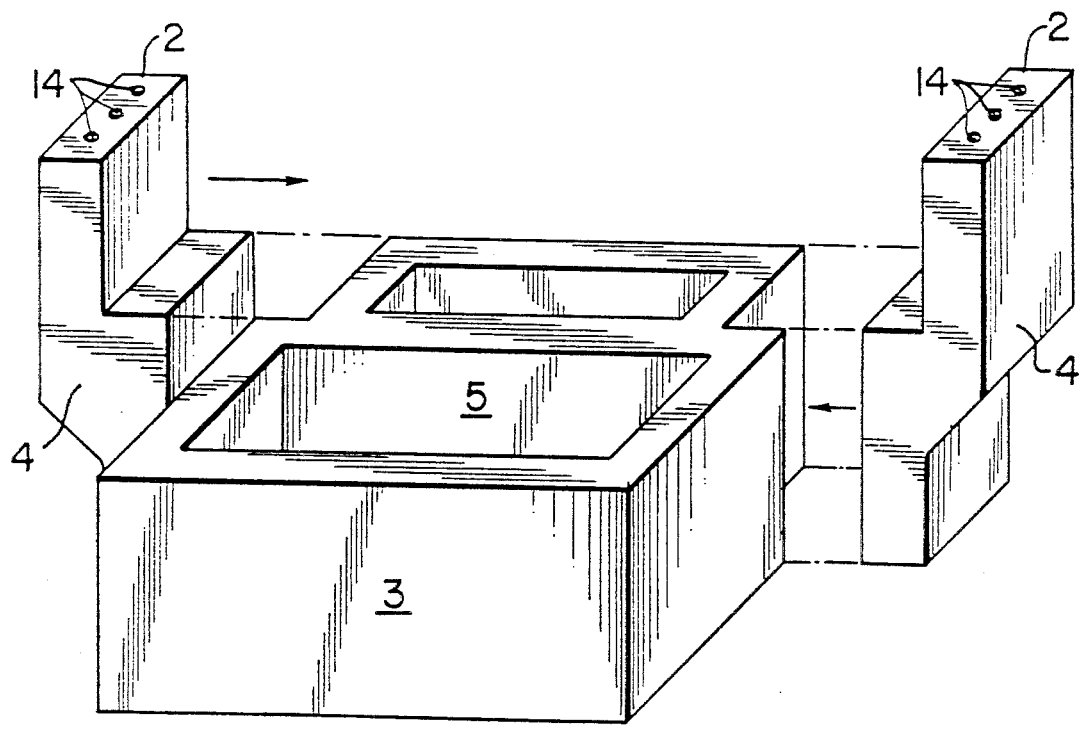
FIG. 11 shows the middle machine bed and the lateral cheeks in the construction according to FIG. 10.

The portal columns P can comprise one piece, e.g. cast mineral. As can be seen from FIGS. 8 to 11, the portal column P can also be produced from three parts, particularly in large machines, specifically from a middle machine bed 3 and two lateral beds 4 at both sides comprising the portal cheeks 2. If the side cheeks 2 are bent outward at both sides relative to the lateral beds 4, as shown in FIGS. 10 and 11, the guide slide strokes x and u can be lengthened at both sides to $B_2$. It can also be seen from FIGS. 8 to 11 that the machine bed 1 is constructed as a hollow case, wherein the interior space 5 can serve to receive a lifting container 6, which can be lowered, and aggregates for feeding or guiding off cutting wire. A device for clamping workpieces or workpiece pallets, which is constructed as a workpiece clamping table frame 8 according to FIG. 2, is arranged on the machine bed 1.

Figure 4:
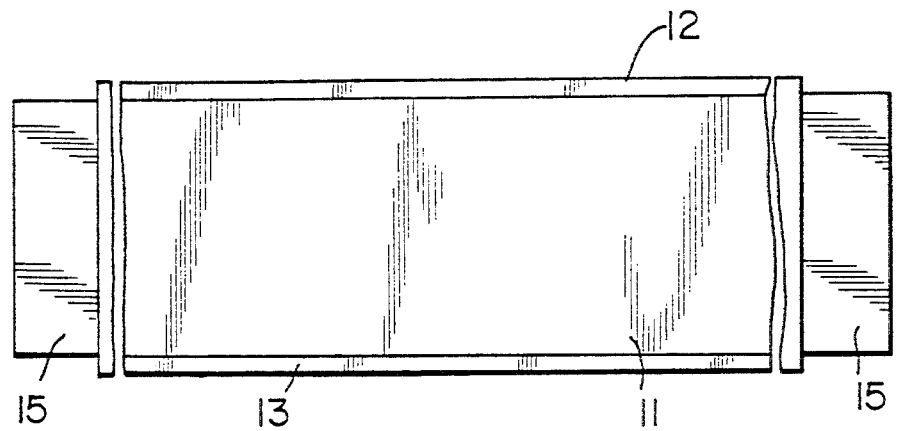
FIGS. 4, 5 and 6 show the portal bridge in a front view and in sectional views.
Figure 5:
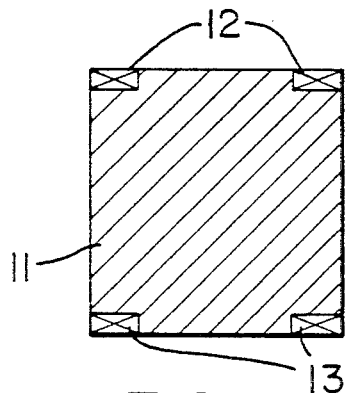
Figure 6:
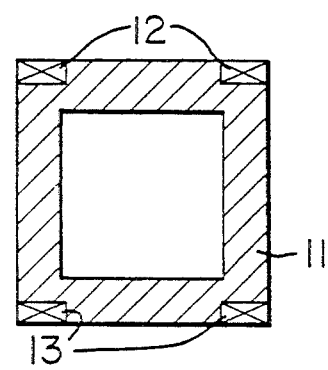
Figure 7:
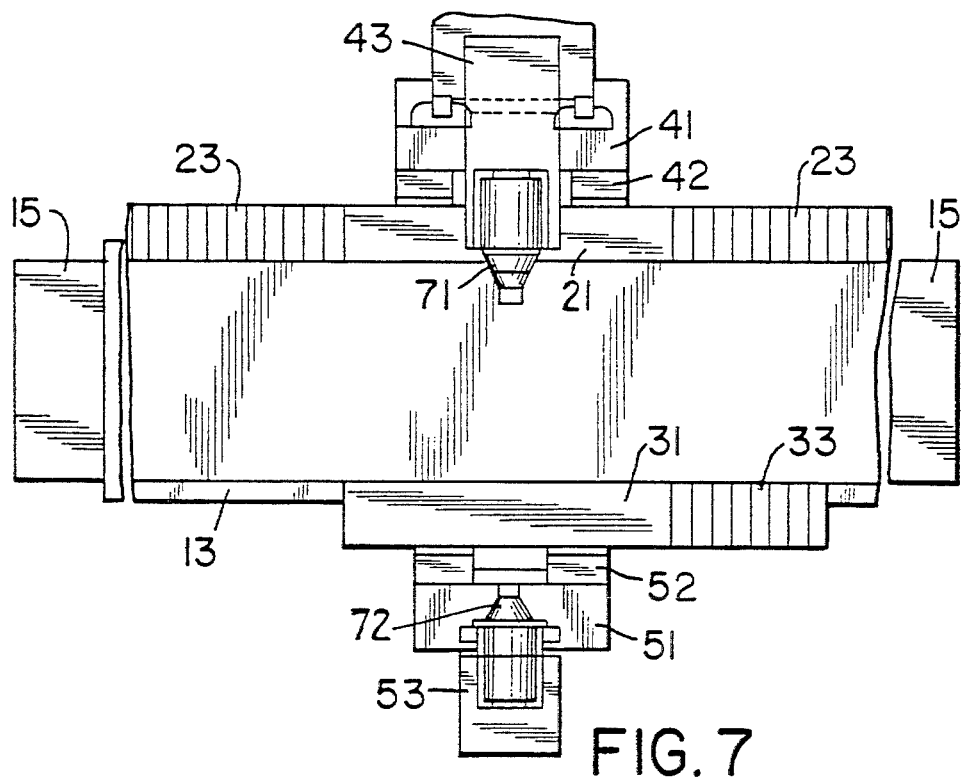
FIG. 7 shows the portal bridge with the carriage guide elements.
Figure 8:
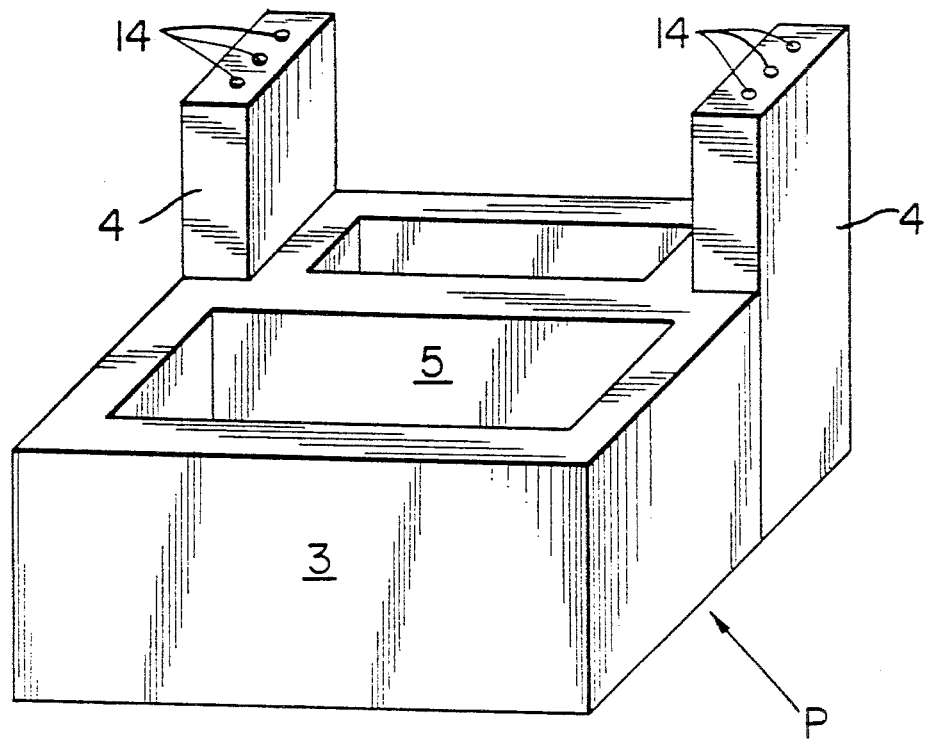
FIG. 8 shows the machine bed with the portal cheeks.
Figure 9:
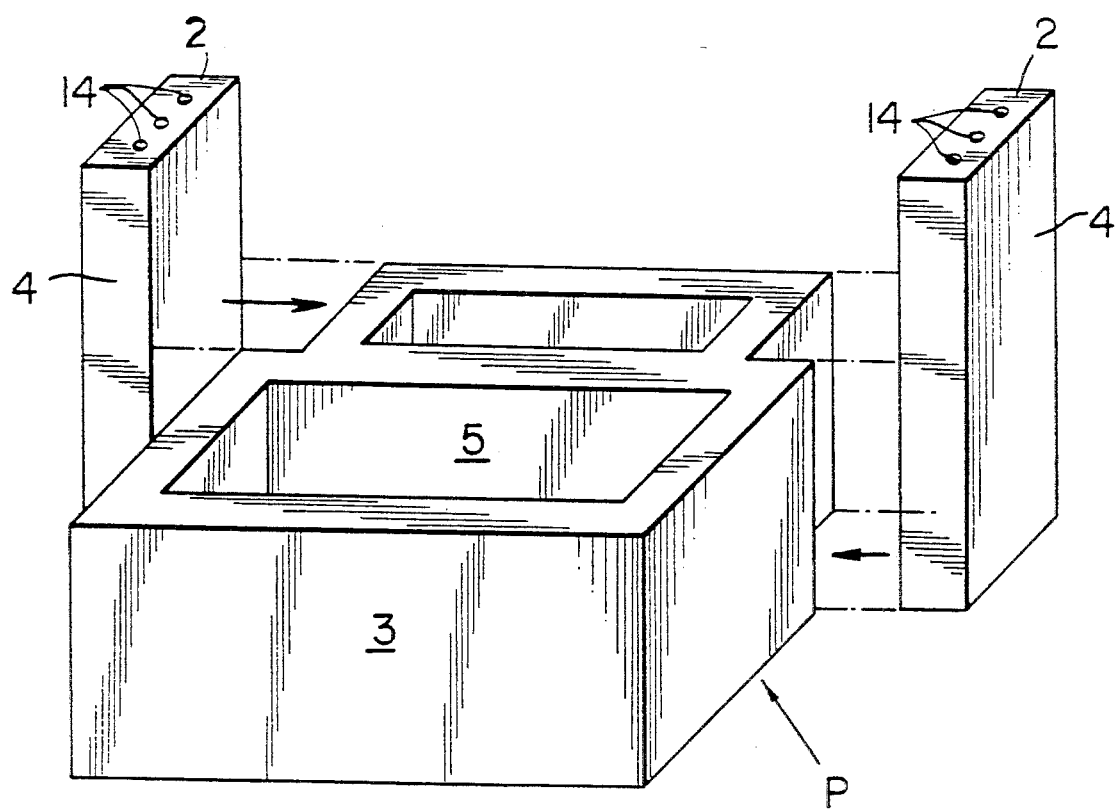
FIG. 9 shows the machine bed according to FIG. 8 in three-part construction.

The portal bridge 11, as autonomous structural unit, is preferably shaped as a square solid and hollow body, as shown in FIGS. 4 to 6; however, it can also be constructed as a spatial framework. In addition, the portal bridge is exchangeable and can be rigidly connected to the side cheeks 2 by means of the connection devices 14 in order to enable different machine layouts. The portal bridge 11 is provided at its upper and lower sides with guides 12 and 13 for the x and u axes. The upper and lower guide carriages 21 and 31 forming the respective autonomous structural components are displaceable in these guide paths in the x and u axes by means of computer-controlled drives, not shown.

The lower guide slide 51 is supported in the y axis in guide slide elements at the lower guide carriage 31 and ends in the lower cantilever arms 53 at which the lower wire guide head 72 is arranged. The lower cantilever arm 53 is constructed so as to be sealed relative to the lower guide carriage 31 and the machine bed by means of the seal 9.

The upper guide slide 41 is supported at the upper guide carriage 21 by means of the guide slide elements 42 and ends in the horizontal cantilever arm 43 at which the center sleeve guide slide 45 is supported in the z axis 44 in the vertical cantilever arm 59 in the center sleeve guide path 46. The upper wire guide head 71 is supported at the center sleeve guide slide 45.

Embodiment examples of the individual structural components and structural elements are shown in FIGS. 4 to 7, the reference numbers mentioned above for the individual constructional features apply to these.

We claim:

1. Wire erosion machine in portal construction comprising:
   a) a machine bed with two lateral columns,
   b) a workpiece clamping table frame,
   c.1) an upper cantilever arm above the workpiece clamping table frame comprising a wire deflecting guide,
   c.2) a lower cantilever arm below the upper cantilever arm comprising a wire deflecting guide,
   d) guide carriage and slide provided with controllable forward feed drives for the relative displacement of the cantilever arms in x, y and z axes relative to the workpiece clamping table frame
   characterized by
   e) a portal column (P) comprising one or more pieces and forming a first structural component unit,
   f) a portal bridge (11) comprising one or more pieces which forms a second autonomous structural unit, is exchangeable, can be placed on the portal column (P) and is rigidly connectable with the portal column,
   f.1) exchangeable upper and lower guide carriages (21, 31) above and below the portable bridge (11) in each instance which are displaceable in the x axis in guides (12, 13) and form a third and a fourth autonomous structural component group,
   f.2) guide slides (41, 51) which are arranged at the guide carriages (21, 31) of the third and fourth structural component groups, constructed so as to be displaceable in the y axis as autonomous exchangeable units, and upper and lower cantilever arms (43, 53) which are connected with the exchangeable units and provided with wire guide and deflecting members.

2. Wire erosion machine according to claim 1, characterized in that the guide carriages (21, 31) are identically constructed.

3. Wire erosion machine according to claim 1, characterized in that the upper and the lower exchangeable guide slides in the y axis (41, 51) are displaceable in each instance in the upper and lower guide slide elements (42, 52) in the upper and lower y and v axes.

4. Wire erosion machine according to claim 1, characterized in that the upper cantilever arm (43) is arranged at the upper guide slide in the y axis (41), which upper cantilever arm (43) comprises a center sleeve guide path (46) in the z axis (44) in which a center sleeve guide slide (45) is guided, the upper wire guide and deflecting device being arranged at the lower end of the center sleeve guide slide (45) in a wire guard head (71).

5. Wire erosion machine according to claim 1, characterized in that the lower cantilever arm (53) is arranged at the lower guide slide in the y axis (51), which lower cantilever arm (53) is provided with a lower wire guiding and deflecting device arranged in a wire guide head (72).

6. Wire erosion machine according to claim 1, characterized in that the forward feed drives of the upper and lower guide carriages (21, 31) and guide slides (41, 51) with their upper and lower cantilever arms (43, 53) and wire guide heads (71, 72), which guide carriages (21, 31) and guide slides (41, 51) are displaceable in the x and y coordinates, can be driven and positioned in a computer-controlled manner in synchronous running as well as in both coordinates (x, y) in a horizontal plane in desired selectable and programmable relative displacement between the upper and lower wire guide head (71, 72).

7. Wire erosion machine according to claim 1, characterized in that the portal column, as a first structural component group unit, comprises a machine bed (1) and portal cheeks (2) which are connected in one piece with the machine bed at both sides and are provided with connection surfaces and connection devices for rigid connection with the portal bridge (11).

8. Wire erosion machine according to claim 1, characterized in that the portal column (P) comprises three parts which are rigidly connected with one another, specifically a middle machine bed (3) and lateral beds (4) at both sides comprising portal cheeks (2) which are provided with connection surfaces and connection devices (14) for the rigid connection with the portal bridge (11).

9. Wire erosion machine according to claim 1, characterized in that the portal bridge (11) is provided at both sides with connection surfaces and devices (14) for the rigid connection with the portal cheeks (2) of the portal column (P) and with guides (12, 13) for the guide carriages (21, 31) in the x axis, which guides (12, 13) are arranged at the top and bottom side and extend in the x axis.

10. Wire erosion machine according to one of claims 7 to 9, characterized in that the connection devices (14) are constructed so as to be detachable for the rigid connection between the portal cheeks (2) and the portal bridge (11).

* * * * *